United States Patent [19]

Flynn

[11] Patent Number: 5,710,493
[45] Date of Patent: Jan. 20, 1998

[54] CIRCUIT AND METHOD FOR ALTERNATING CURRENT MOTOR CONSTRUCTIONS

[75] Inventor: Charles J. Flynn, Greenwood, Mo.

[73] Assignee: Magnetic Revolutions Limited, L.L.C., St. Louis, Mo.

[21] Appl. No.: 519,465

[22] Filed: Aug. 25, 1995

[51] Int. Cl.$^6$ .............................. H02K 29/08; H02P 6/14
[52] U.S. Cl. .......................... 318/254; 318/721; 318/724
[58] Field of Search ....................... 318/138, 254, 318/439, 700, 720, 721, 722, 244, 245, 724

[56] References Cited

U.S. PATENT DOCUMENTS

| | | | |
|---|---|---|---|
| 3,679,953 | 7/1972 | Bedford | 318/138 |
| 4,039,913 | 8/1977 | Clegg | 318/254 X |
| 4,520,303 | 5/1985 | Ward | 318/778 |

*Primary Examiner*—Bentsu Ro
*Attorney, Agent, or Firm*—Haverstock, Garrett and Roberts

[57] ABSTRACT

The present invention relates to a control circuit for a motor, the motor including a rotor having a non-magnetic body portion and a peripheral portion, the peripheral portion being formed on permanently magnetized material, one arcuate portion thereof having north magnetic pole and another arcuate portion having south magnetic pole, a pair of motor coils, a diode bridge circuit having opposed input connections and opposed output connections, a circuit for connecting the respective opposed input connections of the bridge circuit in series with the pair of coils across an alternating current source, a first circuit portion connected across the opposed output connections of the diode bridge circuit including a controllable switch device having a control gate, circuitry to control the voltage applied to the control gate to control the conducting condition thereof and hence current flow through the pair of coils, circuit means including first and second parallel circuits each having a resistor in series with a diode, the first parallel circuit being connected between one of the opposed input connections of the diode bridge rectifier circuit and the second parallel circuit being connected to the other of the opposed input connections of the diode bridge circuit, the outputs of the first and second parallel circuits being connected to the control gate of the controllable switch device, and a Hall Effect device having a connection to the first circuit portion and a connection between the second circuit portion which is controlled by the condition of the Hall Effect device.

28 Claims, 4 Drawing Sheets

CIRCUIT AND METHOD FOR ALTERNATING CURRENT MOTOR CONSTRUCTIONS

The present invention relates to an alternating current motor construction and should be considered in conjunction with the construction shown in co-pending patent application Ser. No. 08/402,927 in the name of the same inventor. The present motor is likewise an alternating current motor that is highly efficient, stays cool during operation, is inexpensive to make using known components and operates at a given frequency depending upon the frequency of the alternating current input source. The present motor also has relatively high torque for its size and can be used for a large number of known purposes.

The present invention relates to a circuit that can be used with many different kinds of alternating current motor structures where the motor has windings through which current flows to generate the driving electro-magnetic force. The circuit has applications in many different motor structures including the motor structures shown in FIGS. 1 and 8 which are presented by way of example only. The motor has a winding or pair of windings wound so that each will play a part in contributing to the rotation of the motor. The windings or winding portions are connected across an AC input in series with the input connections of a full wave diode rectifier circuit which has its outputs connected to a circuit that controls the direction and timing of current flow through the windings. The device may also include a Hall Effect switch or similar sensing device which controls the timing and direction of the current flow through the motor windings. The circuit includes a controllable device such as a silicon controlled rectifier, a mosfet or a transistor, which has a control element or gate the voltage or current of which controls whether it is in a conducting or non-conducting condition.

OBJECT OF THE INVENTION

It is a principal object of the present invention to teach the construction and operation of a relatively simple alternating current motor which is relatively inexpensive to manufacture and is highly efficient to operate.

Another object is to teach the construction of an alternating current motor which produces substantial torque and can operate in both a synchronous and non-synchronous mode.

Another object is to teach the construction of an alternating current motor which operates with practically no temperature increase even during prolonged periods of operation.

Another object is to teach the construction of an alternating current motor which operates at an efficiency range up to about 80%.

Another object is to teach the construction of an alternating current motor which is relatively simple structurally, is easy to manufacture and can accommodate many existing purposes.

Another object is to provide a simplified means to control the timing and direction of current flow through the windings of an alternating current motor.

Another object is to provide a means to maintain low control voltages in a high voltage motor by placing the control circuit at the center or between two series stator field coils.

Another object is to provide a means where all current flowing through the control circuit also flows through the stator field coils, by placing all control components in a series relationship to the field coils.

These and other objects and advantages of the present invention will become apparent after considering the following detailed specification which covers preferred embodiments thereof.

DETAILED DESCRIPTION OF THE INVENTION

The present invention is directed to an alternating current motor circuit which provides a method for an AC motor to be efficient, to be inexpensive to make, to produce substantial torque, to produce negligible heat during operation, and which can be used in many different applications.

Figure 1:
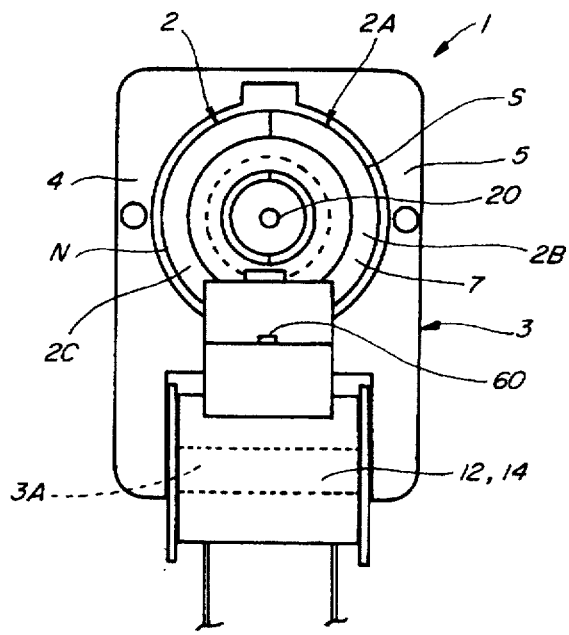
FIG. 1 is a plan view of a motor device constructed according to the teachings of the present invention.
Figure 5:
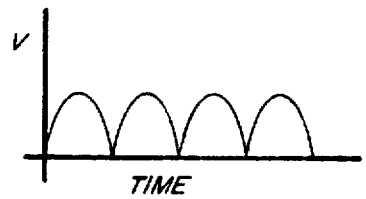
FIG. 5 shows the shape of the diode bridge output voltage over time.

The structure of the motor itself can be similar to the construction shown in FIG. 1 of co-pending application Ser. No. 08/402,927 and the description of the motor structure itself can be embodied in the present application by reference thereto.

The construction of the subject motor 1 is shown in FIG. 1 and includes a rotor 2 mounted on a shaft 20. The rotor 2 is mounted for rotation in a core structure such as laminated core structure 3 which has spaced leg portions 4 and 5. The core 3 also has a connecting portion 3A which connects the two legs 4 and 5. The rotor 2 has a body portion 2A which is shown as cylindrical in shape. Around the periphery of the body 2A are located arcuately shaped permanent magnetic portions 2B and 2C. The magnetic portion 2B has its north magnetic pole adjacent to the outer surface of the rotor 2 and the magnetic portion 2C has its south magnetic pole located adjacent to outer periphery of the rotor 2. A winding or pair of windings 12 and 14 are mounted on the connecting portion 3A of the core 3 structure and the motor 1 also includes a Hall Effect switching device 60, a portion of which extends to adjacent the periphery of the rotor for responding to the magnetic polarity of the respective rotor magnetic portions 2B and 2C. In the construction as shown, the Hall Effect switch 60 will be located adjacent to outer periphery of the magnetic portion 2B during half of each revolution of rotor 2 and adjacent to the outer periphery of the magnetic portion 2C during the remaining half of each revolution of rotor 2.

Under light and no load conditions the motor can operate at above synchronous speeds. This is due to the fact that fractions of half cycles can flow through the coils.

It has been discovered that an alternating current motor constructed according to the present invention operates at an efficiency of up to about 80%, which is much higher than the efficiency of comparable shaded pole motors and many other AC motor constructions, and it has also been discovered that the present construction produces practically no change in the temperature of the rotor or stator coils. Thus the present motor remains cool during operation for extended periods of time. Under actual test conditions it has been determined over an extended period of operation that the motor temperature increased no more than about 1½ F, this being due to the duty cycle being adjusted with rotational speed thus resulting in lower currents during less than synchronous speed operation. Such a minimal temperature change can be ignored for most purposes.

It is also significant to note that the present circuit uses relatively inexpensive, readily available parts and the present motor can be manufactured much more inexpensively than comparable motors used for the same and similar purposes that are commercially available.

FIG. 1 illustrates an embodiment of the subject device which has some advantages for certain applications as will be described in detail. The circuit 100 shown in FIG. 2 includes input connections on leads L1 and L2 which are connected to a source of alternating current energy during operation. The construction of the motor itself maybe similar to that shown in FIGS. 1 or 8 or to many other AC motor constructions. The leads L1 and L2 are connected across a series circuit that includes windings 102 and 104 shown connected in series across the input side of a full wave diode rectifier bridge circuit 106. The bridge circuit 106 has output terminals which are connected across another circuit which includes a controllable switching device labeled as HEXFET 108.

The windings 102 and 104 can be bifilar or lap wound. The alternating current power source has its lead L1 connected to the start side S1 of the winding 102. The other end of the winding 102, labeled F1, is connected to one of the inputs of the diode bridge rectifier 106. The other input side of the diode bridge rectifier 102 is attached to the start side S2 of the second winding 104 and the finish side of the same winding 104, labeled F2, is attached to the input lead L2 of the AC power source. With this arrangement the current will always flow in the same direction through both of the windings 102 and 104 which, the windings and the bridge circuit being in series, represent one winding with the bridge placed at the center between the windings 102 and 104. It is now apparent that the current and voltage applied to the windings 102 and 104 will always be in the same direction through both coils, and the magnetic polarity of the windings 102 and 104 will likewise be the same. If the output terminals of the diode bridge rectifier 106 are shorted when the voltage on lead L1 is positive the current will only flow through the winding 102 and 104 in one direction, but in half cycle increments. If the voltage across leads L1 and L2 is 60 cycles then the outputs of the diode bridge rectifier 106 will be shorted only when lead L1 is positive and current flow will flow only in one direction and for 8 milliseconds. No current will flow for 8 milliseconds on the alternate half cycles. Then current would flow for another 8 milliseconds and so on. By the same token, if the output of the diode bridge circuit 106 is shorted when lead L2 is positive then power will flow in exactly the same manner. If the shorting of the output of the bridge 106 is accomplished selectively, that is based on the angular position of the magnetic rotor, continuous motor action will be produced. If the diode bridge 106 output is shorted for a fraction of a half cycle selectively based on the angular position of the magnetic rotor as described above, and only when lead L1 is positive then any desired speed can be accomplished including speeds higher than the synchronous speed. The characteristics of such a motor would be similar to a DC motor with pulsating current applied to the inputs. However, rather than having multiple power switching components achieve the switching of the coils, the present circuit makes use of the fact that alternating current in conjunction with one power switching component can accomplish the switching. Maximum power is achieved at synchronous speed because the power would be applied 100% of the time with no off periods, but the motor is not restricted to these speeds.

It should not be confused with other circuits wherein the bridge circuit 106 is in series with an AC load and the SCR is placed across the output to simulate a triac. These circuits are used as "cheap triacs" to allow current to flow in both directions during the entire time the SCR is triggered.

Referring again to FIG. 1, one method of "selective AC switching" is when the element that shorts the bridge is a power mosfet, an SCR, a transistor or a similar switching device. In FIG. 1 the output of the diode bridge circuit 106 is placed in series with the switching device 108 and with a zener diode 110 as shown. The zener diode 110 is used to create a voltage drop to assure constant power supply to the Hall Effect switching device 112 labeled IC1. Without the zener diode 110 whenever the switching element conducts the voltage on the outputs of the bridge would be the voltage drop across the switching element. Typically this voltage will be about 0.9 volts in which case the Hall Effect power supply would collapse. A capacitor 114 is provided to smooth the DC supply for the Hall Effect device 112 and provides power for short intervals when the switching element 108 is not conducting.

Another capacitor 116 provides a high frequency by-pass for the Hall Effect device to remove transients and switching spikes from the DC power supply for the Hall Effect device 112. This arrangement makes for an efficient method of providing DC power for the Hall Effect device since all current passing through the power supply is also connected across the load which in this case is the windings 102 and 104. Another capacitor 118 is connected to the output 120 of the Hall Effect device 112. The capacitor 118 creates a time constant to limit the upper speed of the motor, and it does so by creating a switching delay by setting the shortest fraction of a half cycle that is allowed. The resistors R1 and R2, sample the voltage on the input leads L1 and L2. The associated diodes D1 and D2 allow only the positive phase on the respective leads L1 and L2 to pass to the gate 122 of the switching device 108.

The Hall Effect device 112 is positioned adjacent to the peripheral portion of the rotor 2 as described above in order to sense the angular position of the rotor 2 depending upon the magnetic characteristics oft he peripheral portion thereof. The output 120 of the Hall Effect device 112 is applied to the collector of NPN transistor Q1. When the magnetic south pole is placed adjacent to the Hall Effect device 112 the output shorts to ground. The output 120 of the Hall Effect device 112 is presented to the cathodes of diodes D3 and D4. The diodes D3 and D4 have several functions, one of which is to keep the sampled line voltages separate and to allow the sampled voltages to provide positive bias to the collector of the output transistor Q1. When the Hall Effect output NPN transistor is "on" the positive signal across resistor R1 is grounded through a path provided by diode D3 to the collector of the output transistor in the output of the Hall Effect device 112. This prevents the positive potential from lead L1 across the diode D1 from reaching the gate or control element 122 of the switching device 108. When the NPN transistor Q1 is in its "on" state the positive potential from line L2 is applied across resistor R2 and is grounded through the transistor Q1 thereby preventing it from reaching the gate of the switching diode 108. The resistor R3 provides positive bias to the base electrode of the transistor Q1 and places Q1 in the "off" state unless the Hall Effect output is in the "on" state which grounds the positive bias from R3 present on the base of the transistor Q1 in which case the transistor Q1 is in its "off" state. This allows the voltage on lead L2 during its positive half cycle to place a positive potential across the diode D2 to the control gate 122 of the switching device 108. In other words, if the Hall Effect device is "off" and lead L1 is in its positive cycle, the switching element is conducting with a positive voltage on S1 of the winding 102 and a negative is placed on the finish end F2 of the winding 104. If the Hall switch 112 is "on" and lead L2 is in its positive cycle, the switching element 108 is conducting with a negative on S1 and a positive on F2. If the Hall Effect device 112 is "off" and lead L1 is in its negative half cycle, the switching element is "off" and there is no current through the windings 102 and 104. Also if the Hall Effect device 112 is "on" and lead L2 is in its negative cycle the switching element is and no current will flow through the windings 102 and 104. During periods when the switching element 108 is not conducting, the full line voltage applied to L1 and L2 will be present between the resistors R1 and R2 but because diodes D1 and D2 are in the same direction a current path cannot be completed. Also during periods when the switching device 108 is not conducting a voltage one half the line voltage will be present from R1 and R2 to the output of the zener diode 124. This provides a path for this voltage to protect the output of the Hall Effect device 112. The path through the zener diode 124 is in series with the diode 126 and with the zener diode 110 which helps to maintain the supply voltage to the Hall Effect device 112 when the switching device 108 is not conducting. The current flow during the "off" periods is across the windings 102 and 104 but R1 and R2 act to limit the current so as to have a minimum effect on the rotor. The zener diode 126 also acts to limit the voltage that can be present at the gate 122 of the switching device 108 to the value established by the zener diode 126 and this protects the gate 122 of the switching device 108 from excessive voltages. Another diode 128 prevents the voltage at the gate 122 of the switching device 108 from going below the potential on the source side of the switching device 108, which is essential to the operation of the mosfet. A voltage below this potential would be destructive. A capacitor 130 filters transients and switching spikes and is therefore protective of the switching device 108. An advantage of the motor described herein is to provide higher speed operation at lower wattage requirements than is possible with shaded pole motors and with some induction motors.

Figure 2:
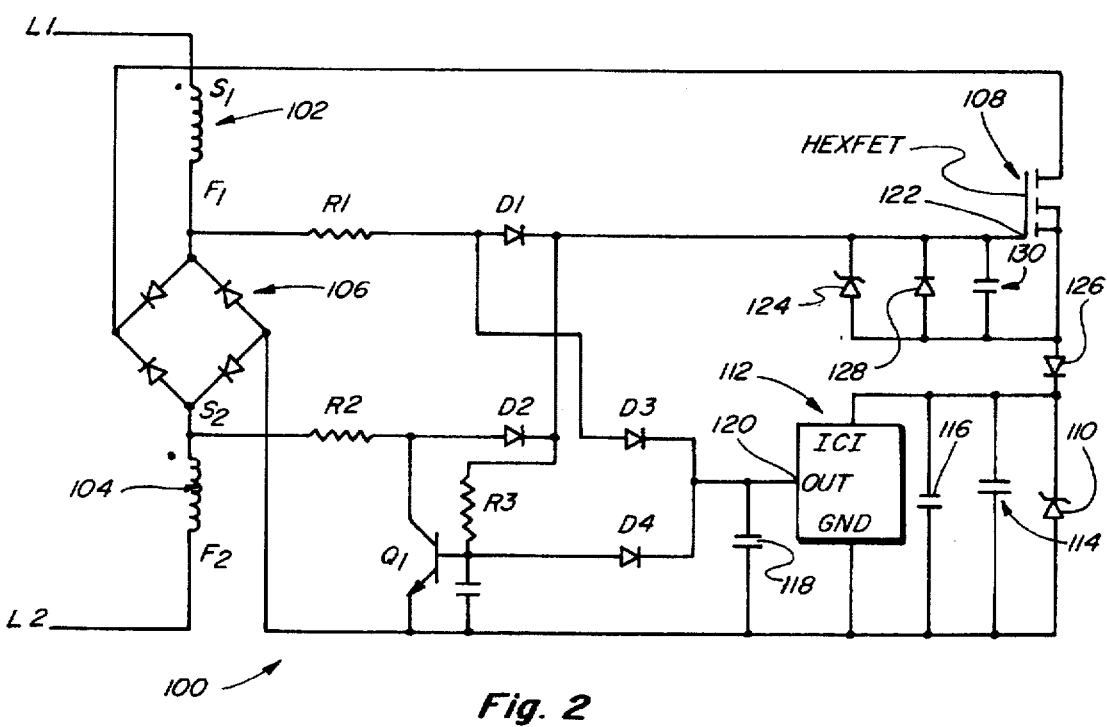
FIG. 2 is a schematic diagram of the circuit employed in the motor device shown in FIG. 1.
Figure 3:
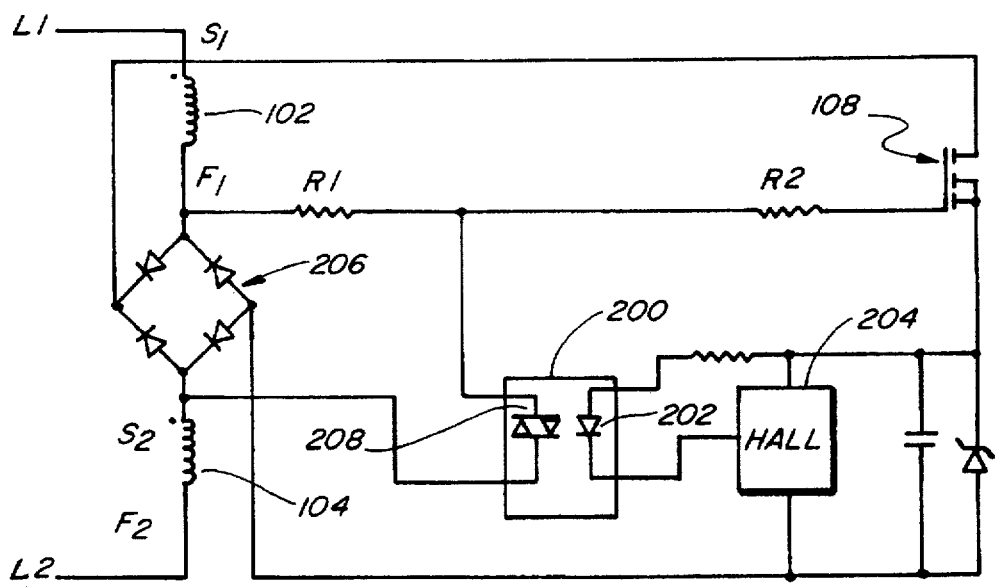
FIG. 3 is a schematic diagram of an alternate circuit employed in the motor device shown in FIG. 1.

FIG. 3 shows another circuit similar to the circuit shown in FIG. 2. It should now be apparent that many different circuit arrangements can be used to produce the desired result. All of the circuits, however, have certain things in common and all are adjustable to control the phase and rotational direction of the motor being controlled. In the circuit shown in FIG. 3 a triac 208 is shown positioned in control block 200 in association with a light emitting diode 202 located in the same control block 200. The control of the circuit shown in FIG. 3 is similar to the control of the other circuits and it includes a device such as a Hall Effect device 204 which is positioned adjacent to the periphery of the rotor which has a portion of its outer surface formed of permanent magnetized material having its north magnetic pole adjacent to the periphery and another portion of the rotor having a permanent magnet portion having its south pole adjacent to the periphery. By placing the Hall Effect device 204 adjacent to the periphery of the rotor it is able to respond to the polarity of the portion adjacent thereto. By relocating the position of the Hall Effect device it is possible to change the direction of rotation of the rotor and the direction of current flow through the motor windings. It can therefore be seen that by placing an AC voltage across the leads L1 and L2 during certain half cycles the voltage on lead L1 will be positive, and this positive voltage will cause current flow through the motor windings in one direction. Depending upon the position of the Hall Effect device it will control whether the controllable switch device 108 will be in a conducting or non conducting condition. If it is in a conducting condition current will flow from the output terminals of the diode bridge circuit 206 until the Hall Effect device 204 changes due to being adjacent a different position of the rotor. The location of the Hall Effect device 204 relative to the peripheral magnetic portions of the rotor controls the direction of rotation of the rotor and the application of voltage on the controlled electrode of the switch. The position of the Hall Effect device 204 relative to the magnetic peripheral portions of the rotor controls the application of energy to the motor. The phase of the line voltage on L1 and L2 and the angular position of the rotor relative to the Hall Effect device 204 are the dominant factors which cause the present motor to function and operate. This is true of all of the various circuit constructions shown in the drawings. They all operate in the same general way and use the same basic method in their operation. For example when line L 1 is on its positive half cycle the connection between the resistors R1 and R2 are controlled by the condition of the triac 208 which in turn is under control of the condition of the Hall Effect device 204. Note in FIG. 3 that the Hall Effect device 204 controls the application of energy to the LED 202 located in the block 200 with the triac 208 forming an Opto-Isolator. When LED 202 is not conducting triac 208 is also in a non-conducting state. Voltage from L1 is present across R1 and R2 and the bridge when L1 is positive. When LED 202 is conducting triac 208 is also conducting and one half of the voltage and current from L2 cancels the flow of voltage and current through resistor R1 from L1. The remaining voltage and current from L2 is presented across R2 to the gate of the mosfet and now the bridge is shorted when L2 is positive. In the construction as shown the rotor has two permanent magnet portions that extend around respective portions of the rotor periphery. A greater number of permanent magnet peripheral portions can also be used on the rotor as desired. The important thing is that the current flow in the coils is under control of the phase of the line voltage on L1 and L2, and is under control of the condition of the Hall Effect device. These principles apply to all of the various embodiments shown.

Figure 4:
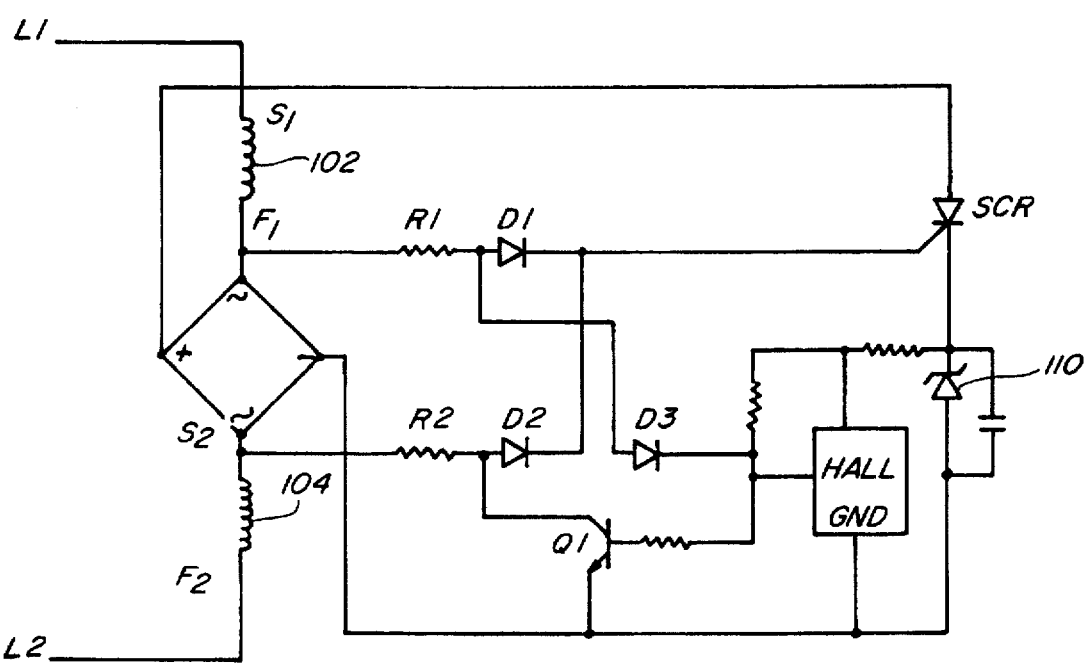
FIG. 4 is a schematic diagram of another alternate circuit employed in the motor device shown in FIG. 1.
Figure 6:
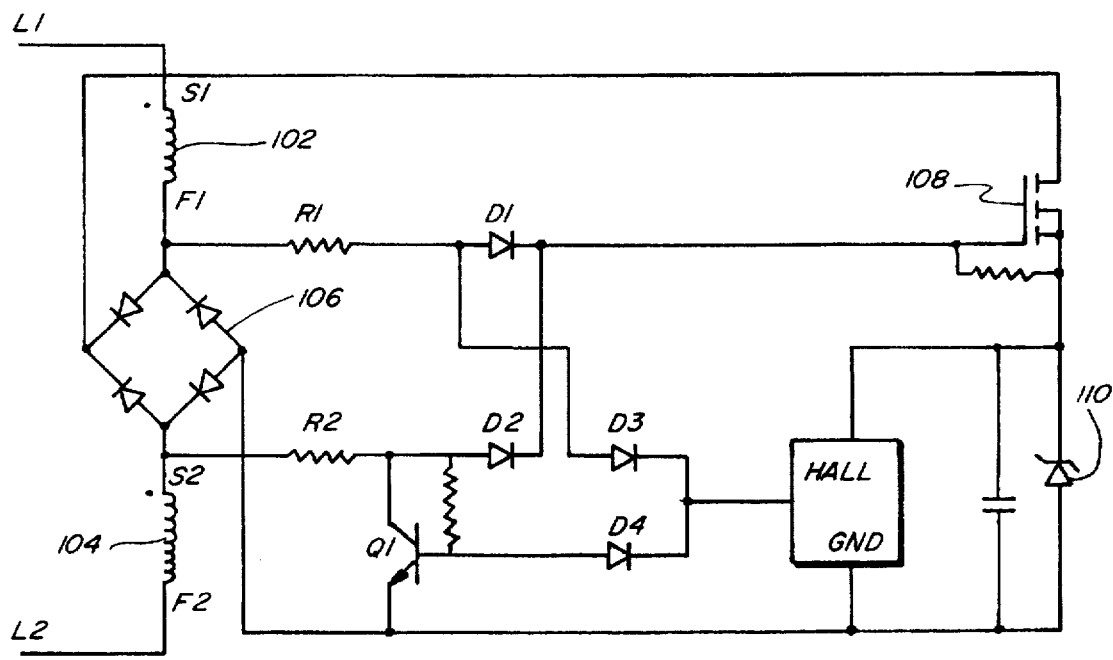
FIG. 6 shows the details of another embodiment of the present motor circuit.
Figure 7:
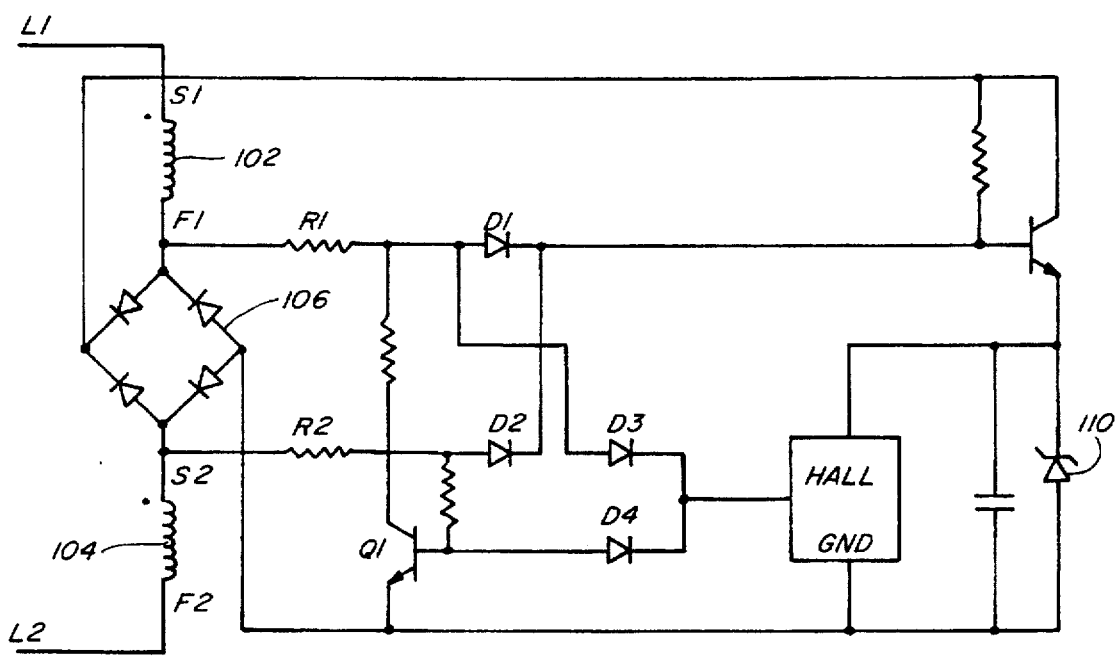
FIG. 7 shows another embodiment of the present AC motor circuit.

The circuits shown in FIGS. 4, 6 and 7 operate in the same manner as the circuits shown in FIGS. 2 and 3 except for the manner in which they process the signals from the input leads L1 and L2, and through this processing identify which phase of the voltage on leads L1 and L2 are involved in order for the Hall Effect switching device to cause the shorting of the diode bridge circuit at the proper phase of the position of the rotor.

Figures 8, 9:
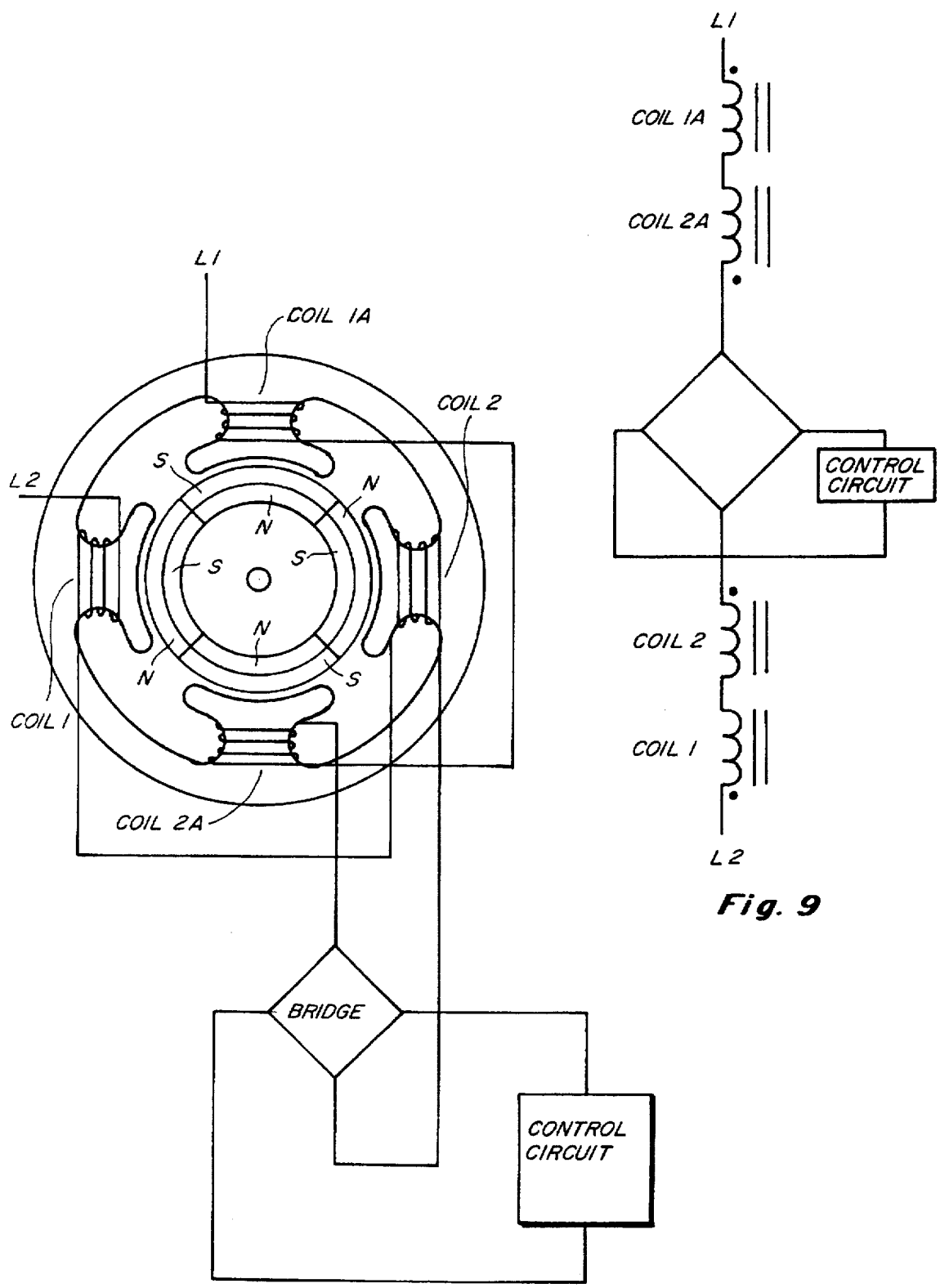
FIG. 8 shows how the coils would be connected and used in a four pole system.
FIG. 9 shows how the coils of FIG. 8 would be connected across an alternating current source.

The motor construction shown in FIGS. 8 and 9 is for implementation in a four pole system. The connection of the coils or coil portions are similar to the connections shown in the motor construction of FIG. 1. In FIGS. 8 and 9, the coils are connected across the bridge circuit in the manner already described and the rotor has a body portion with four arcuate sections arranged with their north and south poles as shown in FIG. 8. The circuit of the motor coils is also shown in FIG. 9 in a simplified manner. The operation of the four pole construction is similar to the operation of the two pole construction. The Hall Effect device causes the shorting of the bridge output at the proper phase based upon the position of the rotor. As illustrated in FIGS. 8 and 9, coils 1A and 2A are wound in opposite directions and will not have the same magnetic polarity. This is also true of coils 1 and 2. Further, coils 1A, 2A, 1, and 2 are neither bifilar nor lap wound. Similarly, in a two pole radial frame construction, coils 1 and 2 would be wound in opposite directions.

Thus there has been shown and described, several embodiments of a novel circuit for an alternating current motor which fulfills all the objects and advantages sought therefor. It will be apparent to those skilled in the art, however, that many changes, variations, modifications, alterations and other uses and applications are possible. All such changes, variations, modifications, alterations and other uses and applications which do not depart from the spirit and scope of the invention are deemed to be covered by the invention which is limited only by the claims which follow.

What is claimed is:

1. A method of controlling the operation of an AC motor having a rotor mounted for rotation about an axis, the rotor having a peripheral portion with at least one pair of north and south poles adjacent to the periphery thereof, and a motor coil, the method including the steps of connecting the motor coil in series with the input terminals of a full wave rectifier circuit across a source of alternating current energy, connecting the output terminals of the full wave rectifier circuit across a controllable switch device, and controlling the opening and closing of the switch device including positioning a sensing member adjacent to the peripheral portion of rotor, the opening and closing of the switch device controlling the direction of current flow through the motor coil.

2. The method of claim 1 wherein the motor coil has a first portion connected to one side of the input of the full wave rectifier circuit and a second portion connected to the opposite side of the input of the full wave rectifier circuit.

3. The method of claim 1 wherein the sensing member is a Hall Effect device.

4. The method of claim 1 wherein the sensing member is a photo transistor.

5. The method of claim 1 including a stator on which the motor coil is mounted.

6. The method of claim 1 wherein the switch device is a silicon controlled rectifier.

7. The method of claim 1 wherein the switch device is a hexfet.

8. The method of claim 1 wherein the switch device is a mosfet.

9. The method of claim 1 wherein the switch device is a transistor.

10. A method of controlling the operation of an AC motor having a stator and a rotor, the rotor having a peripheral portion formed of permanent magnet material part of which has its north magnetic pole adjacent to the periphery thereof and a part of which has its south magnetic pole adjacent to the periphery thereof, a motor coil mounted on the stator, the method including the steps of connecting the motor coil in series with the input terminals of a full wave diode rectifier circuit across an alternating current energy source, connecting the output terminals of the full wave diode rectifier circuit across a controllable switch device, and controlling the opening and closing of the controllable switch device including positioning a sensing member adjacent to the magnetic peripheral parts of the rotor, the opening and closing of the switch device controlling the direction of current flow through the motor coil.

11. A method of controlling an alternating current motor having a pair of windings connected in series with the input connections of a full wave diode bridge circuit across an AC energy source, the bridge circuit having input and output connections, the motor also including a stator and a rotor, the rotor having a body portion of non magnetic material and a peripheral portion formed of permanently magnetized material at least one portion of which has its north pole adjacent the periphery of the rotor and another portion which has its south magnetic pole adjacent the periphery of the rotor, the steps of the method including positioning a sensing device adjacent to the periphery of the rotor which sensing device responds differently to the presence of a north magnetic pole adjacent thereto than a south magnetic pole adjacent thereto, the sensing device controlling switch means in the circuit across the output connections of the full wave diode bridge circuit, the switch means across the output terminals of the full wave diode bridge circuit being controlled by the position of the sensing device relative to the peripheral portions of the rotor such that alternate half cycles of the alternating current input are under control of said sensing device.

12. An alternating current motor construction including, a rotor mounted for rotation, the rotor having a peripheral portion formed of permanently magnetized material, a first arcuate portion of which has its north magnetic pole adjacent to the outer periphery thereof and a second arcuate portion which has its south magnetic pole adjacent the outer periphery thereof, a coil having separate turn portions, the separate turn portions being oriented to produce magnetic fields when current flows therethrough, circuit means for said motor including a pair of input connections for connection to an alternating current source of predetermined frequency, a diode bridge circuit having a pair of input connections and a pair of output connections, means connecting the separate turn portions of the coil in series with the respective bridge input connections on opposite sides of the diode bridge circuit, each turn portion having one connection to a bridge input connection and another connection to one side of the source of alternating current voltage, and other circuit means connected to the bridge output connections including a positive voltage connection for connection to the anode side of a controllable switch device in series with a voltage control device to the opposite bridge output connection, and first and second circuit portions controlling the conducting condition of the controllable switch device including a first circuit portion connected between one of the diode bridge input connections and the adjacent coil portion through a circuit that includes a resistor in series with a diode, the second circuit portion being connected between the other bridge circuit input connection and including a second resistor element in series with a second diode device connected to the controllable switch device, said second circuit portion including a Hall Effect switching device and a transistor under control thereof.

13. The alternating current motor construction of claim 12 wherein the controllable switch device is a silicon controlled rectifier device.

14. The alternating current motor construction of claim 12 wherein the controllable switch device is a mosfet.

15. The alternating current motor construction of claim 12 wherein the controllable switch device is a transistor.

16. The alternating current motor construction of claim 12 wherein the controllable switch device is a triac.

17. The alternating current motor construction of claim 12 wherein the Hall Effect switching device includes means for mounting it adjacent to the permanently magnetized peripheral portions of the rotor for responding to the magnetic characteristic of the peripheral portions.

18. An alternating current motor construction including, a rotor mounted for rotation, the rotor having a non-magnetic body portion and a peripheral portion extending therearound formed of permanently magnetized material, an arcuate portion of which has its north magnetic pole adjacent to the outer periphery of the rotor and another arcuate portion having its south magnetic pole adjacent to the outer periphery of the rotor, a pair of coil portions, and circuit means for controlling current flow through the pair of coil portions, said circuit means including a pair of input connections for connection across a source of alternating current energy of predetermined frequency, a diode bridge circuit having a pair of input connections and a pair of output connections, means connecting the coil portions in series on opposite sides of the bridge input connections between the bridge input connections and the source of alternating current voltage, a circuit formed by a controllable switch device and a voltage control device in series across the output connections of the diode bridge circuit, said controllable switch device having a control gate, and means to control the turning on and turning off of the controllable switch device including first and second parallel circuits including respective connections to the input connections of the diode bridge circuit and an output connected to the control gate of the controllable switch device, said first and second parallel circuits each including a resistor and a diode in series, and means to control the application of positive going pulses in the input on alternate half cycles for applying to the control gate of the controllable switch device including a Hall Effect device having a portion positioned adjacent to the peripheral portion of rotor for responding to the polarity of the peripheral portion of the permanently magnetized rotor portions and a transistor connected to the second parallel circuit, the conducting condition of which is controlled by the condition of the Hall Effect device.

19. An AC motor control circuit comprising, a rotor having a non-magnetic body portion and a peripheral portion extending therearound, said peripheral portion being formed of permanently magnetized material, one arcuate portion thereof having its north magnetic pole adjacent to the outer periphery and another arcuate portion having its south magnetic pole positioned adjacent to the outer periphery thereof, a pair of motor coils, a diode bridge circuit having opposed input connections and opposed output connections, means connecting the respective opposed input connections in series with respective ones of the coils across a sottree of alternating current voltage of predetermined frequency, circuit means connected across the opposed output connections of the diode bridge circuit including a controllable switch device, said controllable switch device having a control gate, and means to control the voltage applied to the control gate of the controllable switch device to control the conducting condition thereof and hence the current flow through the pair of motor coils, said circuit means including first and second parallel circuits each having a resistor in series with a diode, the first of said parallel circuits being connected between one of the opposed input connections of the diode bridge circuit and the second of said parallel circuits being connected to the other of said opposed input connections of said diode bridge circuit, the output sides of said first and second parallel circuits being connected to the control gate of the controllable switch device, and means to control the time during which a positive voltage is applied to the control gate of the controllable switch device, said means to control the time including a Hall Effect device positioned to respond to the polarity of the arcuate portions of the permanent magnet peripheral portions of the rotor, said Hall Effect device having a connection to the first parallel circuit and a connection to the second parallel circuit including a transistor, the conducting condition of which is controlled by the condition of the Hall Effect device whereby on alternate half cycles of the alternating current input voltage a conducting condition is established through the respective coil portions.

20. An alternating current motor control circuit comprising, a rotor mounted for rotation, at least one motor field coil connected in series with the input terminals of a diode bridge circuit across a source of alternating input energy, controllable switch means and means to control the opening and closing of the switch means including a control circuit connected between the input and output terminals of the diode bridge circuit and means for controlling the switch means to cause current to flow through the at least one motor field coil in the same direction on alternate half cycles of the alternating current input.

21. The motor control circuit of claim 20 wherein the control circuit includes a silicon controlled rectifier.

22. The motor control circuit of claim 20 wherein the control circuit includes a transistor.

23. The motor control circuit of claim 20 wherein the control circuit includes a Hall Effect switching device.

24. An alternating current motor circuit comprising, a rotor mounted for rotation including a cylindrical body member of non-magnetic material and a peripheral portion extending around the body member, the peripheral portion including a first arcuate portion having its north magnetic pole adjacent to the periphery of the rotor and a second arcuate portion having its south magnetic pole adjacent to the periphery of the rotor, a pair of similar motor windings, and circuit means connected to the windings including connections to an alternating current energy source, one side of the energy source is connected to one end of one of the windings, the other winding having a connection to the opposite side of the energy source, a diode bridge circuit having input connections respectively connected to respective opposite ends of the windings and output terminals including a positive voltage output terminal and a negative voltage output terminal, means connecting the positive and negative voltage output terminals of the diode bridge circuit across a circuit that includes a controllable switch device having a control electrode, means for controlling the conducting condition of the controllable switch device including similar first and second circuit portions each including a series connected impedance and diode, said first and second circuit portions being connected to respective ones of the input connections to the diode bridge circuit and an output of the diode bridge circuit connected to the control electrode of the controllable switch device, and means to control the application of positive input voltage to the control electrode of the controllable switch device and a current control device connected to the second circuit portion, the conducting condition of the second circuit portion is under control of the controllable switch device, said controllable switch device and said circuit under control thereof controlling the application of voltage to the control electrode.

25. An alternating current motor circuit comprising, first and second motor windings mounted on a motor structure, a rotor having a non-conductive cylindrical portion mounted for rotation on a shaft extending therethrough, said rotor having a peripheral portion formed of permanent magnet material, said peripheral portion including a first arcuate portion with its north magnetic pole adjacent to the outer periphery of the rotor and a second arcuate portion having its south magnetic pole adjacent to the outer periphery of the rotor, the motor circuit having input connections connected to opposite sides of an alternating current source of energy, a diode bridge rectifier circuit having a pair of opposed input terminals and a pair of opposed output terminals, circuit means forming a series circuit across the alternating current source of energy, said series circuit including a connection from one side of the alternating current source to the first of the windings, to one of the input connections of the diode bridge rectifier circuit, from the other input terminal of the diode bridge rectifier circuit to the second of said windings and from there to the other side of the alternating current source of energy, and means to control the current flow through the first and second motor windings including a first circuit portion connected across the output terminals of the diode bridge rectifier circuit, the first circuit portion including a controllable switch device, and a second circuit portion positioned to respond to the permanent magnet peripheral portions of the rotor, said second circuit portion having connections connected to the respective input terminals of the diode bridge rectifier circuit.

26. A motor control circuit comprising:

a pair of windings mounted on a motor, a rotor and support means therefor, the motor control circuit including an input control circuit connected across an alternating current source, the input control circuit including a diode bridge circuit having pairs of opposed input and outputs, the inputs being connected in series with the pair of windings across an AC source, and an output control circuit for controlling current flow through the pair of windings, said output control circuit including a controllable switch circuit connected across the outputs of the diode bridge circuit, said controllable switch circuit including a switch device having a control gate, and means to control the opening and closing of the switch device by selectively controlling the application of positive voltage to the control gate of the controllable switch device.

27. The motor control circuit of claim 26 wherein the output control circuit connected across the input of the diode bridge circuit includes a Hall Effect device having a portion positioned adjacent to the outer periphery of the rotor, said rotor having a peripheral portion formed of permanently magnetized material, a portion of which has its north pole adjacent to the outer periphery of the rotor and another portion having its south pole positioned adjacent to the outer periphery of the rotor, and a current operated device connected between the inputs to the diode bridge circuit, said current operated device being under control of the condition of the Hall Effect device.

28. A motor control circuit comprising:

a pair of windings mounted on a motor, a rotor and journal means supporting the rotor for rotation, means for connecting the pair of windings in a circuit, said rotor having a body portion supported for rotation by the journal means and a peripheral portion extending around the outer surface of the body portion, said peripheral portion being formed of permanently magnetized material, one arcuate portion thereof having its north magnetic pole adjacent to the periphery of the rotor and another arcuate portion having its south magnetic pole positioned adjacent to the periphery of the rotor, the motor control circuit including an input control circuit connected across a source of alternating current energy, the input control circuit including a full wave diode bridge rectifier circuit having its input connections connected in series with the windings of said pair of windings across the alternating current source, and an output control circuit for controlling current flow through the pair of windings, said output control circuit being connected across the output of the full wave diode bridge rectifer circuit including a controllable switching device, other circuit means including means controlling the switching device in a manner to control a switch means connected across the output of the full wave diode bridge rectifier circuit, said other circuit means including means positioned adjacent to the peripheral portion of the rotor for responding to the polarity of the peripheral portion of the rotor adjacent thereto, said means controlling whether the switch means is in its open or closed condition thereby controlling current flow through the pair of windings.

* * * * *

UNITED STATES PATENT AND TRADEMARK OFFICE
CERTIFICATE OF CORRECTION

PATENT NO. : 5,710,493
DATED : January 20, 1998
INVENTOR(S) : Charles J. Flynn

It is certified that error appears in the above-identified patent and that said Letters Patent is hereby corrected as shown below:

Column 4, line 54, "oft he", should be --of the--.

Column 5, line 25, after "is" insert --off--.

Column 10, line 5, "sottree" should be --source--.

Column 12, line 50, "rectifer" should be --rectifier--.

Signed and Sealed this

Twenty-first Day of April, 1998

Attest:

BRUCE LEHMAN

Attesting Officer     Commissioner of Patents and Trademarks